(12) United States Patent
Stuart et al.

(10) Patent No.: US 10,965,889 B2
(45) Date of Patent: Mar. 30, 2021

(54) THERMAL IMAGER THAT ANALYZES TEMPERATURE MEASUREMENT CALCULATION ACCURACY

(75) Inventors: Michael D. Stuart, Issaquah, WA (US); James T. Pickett, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 915 days.

(21) Appl. No.: 14/127,638

(22) PCT Filed: Jun. 20, 2012

(86) PCT No.: PCT/US2012/043313
§ 371 (c)(1),
(2), (4) Date: Feb. 10, 2014

(87) PCT Pub. No.: WO2012/177740
PCT Pub. Date: Dec. 27, 2012

(65) Prior Publication Data
US 2014/0176725 A1    Jun. 26, 2014

Related U.S. Application Data

(63) Continuation-in-part of application No. 13/164,211, filed on Jun. 20, 2011, now abandoned.

(51) Int. Cl.
*H04N 5/33* (2006.01)
*G01J 5/02* (2006.01)
*G01J 5/08* (2006.01)

(52) U.S. Cl.
CPC ............... *H04N 5/33* (2013.01); *G01J 5/025* (2013.01); *G01J 5/0265* (2013.01); *G01J 5/089* (2013.01)

(58) Field of Classification Search
CPC .......... B60G 2401/14; B60R 21/01534; G01N 2203/0641; G01N 2223/509; H04N 5/33; H04N 5/32
See application file for complete search history.

(56) References Cited

U.S. PATENT DOCUMENTS 6,606,115 B1    8/2003  Alicandro
7,034,300 B2    4/2006  Hamrelius
(Continued)

FOREIGN PATENT DOCUMENTS

JP            9163228 A    6/1997

OTHER PUBLICATIONS

PCT International Search Report for PCT/US2012/043313 dated Dec. 21, 2012, from which the instant application is based, 7 pgs.

*Primary Examiner* — Tung T Vo
(74) *Attorney, Agent, or Firm* — Fredrikson & Byron, P.A.

(57) ABSTRACT

A method and computer program product for determining whether an object of interest can have its temperature measurement calculated by a thermal imaging camera. To do this, the measurement IFOV is converted into linear units. The measurement IFOV may be displayed on the display of the camera as a graphical indicator (100, 100', 100", 100'") or a value. An object of interest can be registered with the graphical indicator (100, 100', 100", 100'") or its dimension compared with the measurement IFOV and then it is determined whether the temperature measurement of the object can be acceptably calculated. Alternately, data obtained by a matrix of pixel elements may be analyzed to determine whether an accurate temperature can be calculated.

9 Claims, 16 Drawing Sheets

(56) References Cited

U.S. PATENT DOCUMENTS

| | | | |
|---|---|---|---|
| 7,110,035 B1 | 9/2006 | Hellstrand | |
| 7,538,326 B2 | 5/2009 | Johnson | |
| 7,541,588 B2* | 6/2009 | Tabirian | G01S 17/107 250/341.1 |
| 7,542,090 B1* | 6/2009 | Merchant | G02B 27/58 348/335 |
| 7,885,536 B1 | 2/2011 | Richards | |
| 8,067,738 B1* | 11/2011 | Heath | G01J 3/0262 250/338.1 |
| 8,242,445 B1* | 8/2012 | Scanlon | G01J 5/02 250/330 |
| 8,242,446 B2* | 8/2012 | Fleury-Frenette | G01J 5/40 250/336.1 |
| 8,292,496 B1* | 10/2012 | Fine | G01N 33/227 374/8 |
| 8,374,438 B1* | 2/2013 | Wagner | H04N 5/33 250/330 |
| 8,455,825 B1* | 6/2013 | Cranton | H04N 5/2254 250/332 |
| 8,577,120 B1* | 11/2013 | Koshti | G06T 7/0004 250/341.8 |
| 9,066,028 B1* | 6/2015 | Koshti | H04N 5/33 |
| 9,167,972 B2* | 10/2015 | Saint Clair | A61B 5/015 |
| 9,787,913 B1* | 10/2017 | Koshti | H04N 5/33 |
| 2003/0091189 A1* | 5/2003 | Rhoads | H04K 1/02 380/252 |
| 2004/0254472 A1 | 12/2004 | McQuilkin | |
| 2006/0050766 A1* | 3/2006 | Hollander | G01J 5/02 374/121 |
| 2006/0198421 A1 | 3/2006 | Hollander et al. | |
| 2006/0192946 A1* | 8/2006 | Walser | G01C 1/04 356/144 |
| 2006/0289768 A1 | 12/2006 | Vallese et al. | |
| 2007/0087311 A1* | 4/2007 | Garvey | G01J 5/00 434/21 |
| 2007/0174152 A1* | 7/2007 | Bjornberg | G06Q 10/087 705/28 |
| 2008/0166061 A1* | 7/2008 | Hohenberger | H04N 5/23293 382/254 |
| 2008/0265162 A1 | 10/2008 | Hamrelius | |
| 2009/0244048 A1* | 10/2009 | Yamanaka | G09G 3/007 345/212 |
| 2011/0001809 A1 | 1/2011 | McManus | |
| 2011/0032326 A1* | 2/2011 | Hollander | G01J 5/02 348/36 |
| 2011/0074959 A1* | 3/2011 | Strandemar | G01J 5/025 348/164 |
| 2012/0249800 A1* | 10/2012 | George-Svahn | G01J 5/02 348/164 |
| 2012/0307046 A1* | 12/2012 | Lundberg | G01J 5/0022 348/135 |
| 2013/0230074 A1* | 9/2013 | Shin | G01J 5/0025 374/129 |
| 2013/0321638 A1* | 12/2013 | Stratmann | G06T 3/4061 348/162 |

* cited by examiner

*Fig.* 5

$IFOV_{measurement} < X$ $IFOV_{measurement} = X$

Fig. 17

THERMAL IMAGER THAT ANALYZES TEMPERATURE MEASUREMENT CALCULATION ACCURACY

RELATED APPLICATIONS

This application is a 35 U.S.C. 371 national stage filing from International Application No. PCT/US2012/043313 filed Jun. 20, 2012, which claims priority to U.S. application Ser. No. 13/164,211 filed Jun. 20, 2011, the teachings of which are incorporated herein by reference.

TECHNICAL FIELD

The present disclosure pertains to thermal imaging cameras that determine the accuracy of a calculated temperature measurement of an object of interest and, preferably, notify a user of the camera as to the accuracy of the calculated temperature measurement.

BACKGROUND

Handheld thermal imaging cameras, for example, including microbolometer detectors to generate infrared images, are used in a variety of applications, which include the inspection of buildings and industrial equipment. Many state-of-the-art thermal imaging cameras have a relatively large amount of built-in functionality allowing a user to select a display from among a host of display options, so that the user may maximize his 'real time', or on site, comprehension of the thermal information collected by the camera.

As is known, infrared cameras generally employ a lens assembly working with a corresponding infrared focal plane array (FPA) to provide an infrared or thermal image of a view in a particular axis. The operation of such cameras is generally as follows. Infrared energy is accepted via infrared optics, including the lens assembly, and directed onto the FPA of microbolometer infrared detector elements or pixels. Each pixel responds to the heat energy received by changing its resistance value. An infrared (or thermal) image can be formed by measuring the pixels' resistances—via applying a voltage to the pixels and measuring the resulting currents or applying current to the pixels and measuring the resulting voltages. A frame of image data may, for example, be generated by scanning all the rows and columns of the FPA. A dynamic thermal image (i.e., a video representation) can be generated by repeatedly scanning the FPA to form successive frames of data. Successive frames of thermal image data are generated by repeatedly scanning the rows of the FPA; such frames are produced at a rate sufficient to generate a video representation of the thermal image data.

Often, the user of the camera needs to know his distance from an object of interest. This is sometimes necessitated by safety concerns when a user is inspecting, for example, electrical or other potentially hazardous equipment and the user is required to be a certain distance from the equipment. Likewise, sometimes the distance from an object of interest to the user also can affect performance accuracy capabilities of a thermal imager being used for inspection work.

SUMMARY

According to an aspect of the invention, there is provided a method of determining whether an object of interest can have its temperature measurement accurately calculated by a thermal imaging camera comprising:
 a) displaying a measurement IFOV of the camera on a display of the camera as a graphical box;
 b) registering the graphical box with the object of interest on the display; and
 c) determining whether the thermal image of the object of interest fills the graphical box thereby indicating a reliable temperature of the object of interest can be made.

According to another aspect of the invention, there is provided a method of determining whether an object of interest can have its temperature measurement accurately calculated by a thermal imaging camera comprising:
 a) determining a distance between the camera and the object of interest;
 b) calculating a measurement IFOV in linear units; and
 c) displaying the calculated measurement IFOV in linear units on the display of the camera to be viewable by a user of the camera.

According to an aspect of the invention, there is provided a computer program product, comprising a computer usable medium having a computer readable program code embodied therein, said computer readable program code adapted to be executed to implement a method for determining whether an object of interest can have its temperature measurement accurately calculated by a thermal imaging camera, said method comprising:
 a) displaying a measurement IFOV on a display of the camera as a graphical box; and
 b) registering the graphical box with the image of the object of interest on the display.

According to an aspect of the invention, there is provided a method of determining whether an object of interest can have its temperature measurement accurately calculated by a thermal imaging camera comprising:
 a) generating temperature data of an object of interest in the form of a pixel matrix comprised of multiple pixels; and
 b) performing a statistical analysis on the data generated by the pixel matrix to determine uniformity of the data generated by the pixel matrix.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the invention. Like numbers in multiple drawing figures denote like elements.

Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Figure 1:
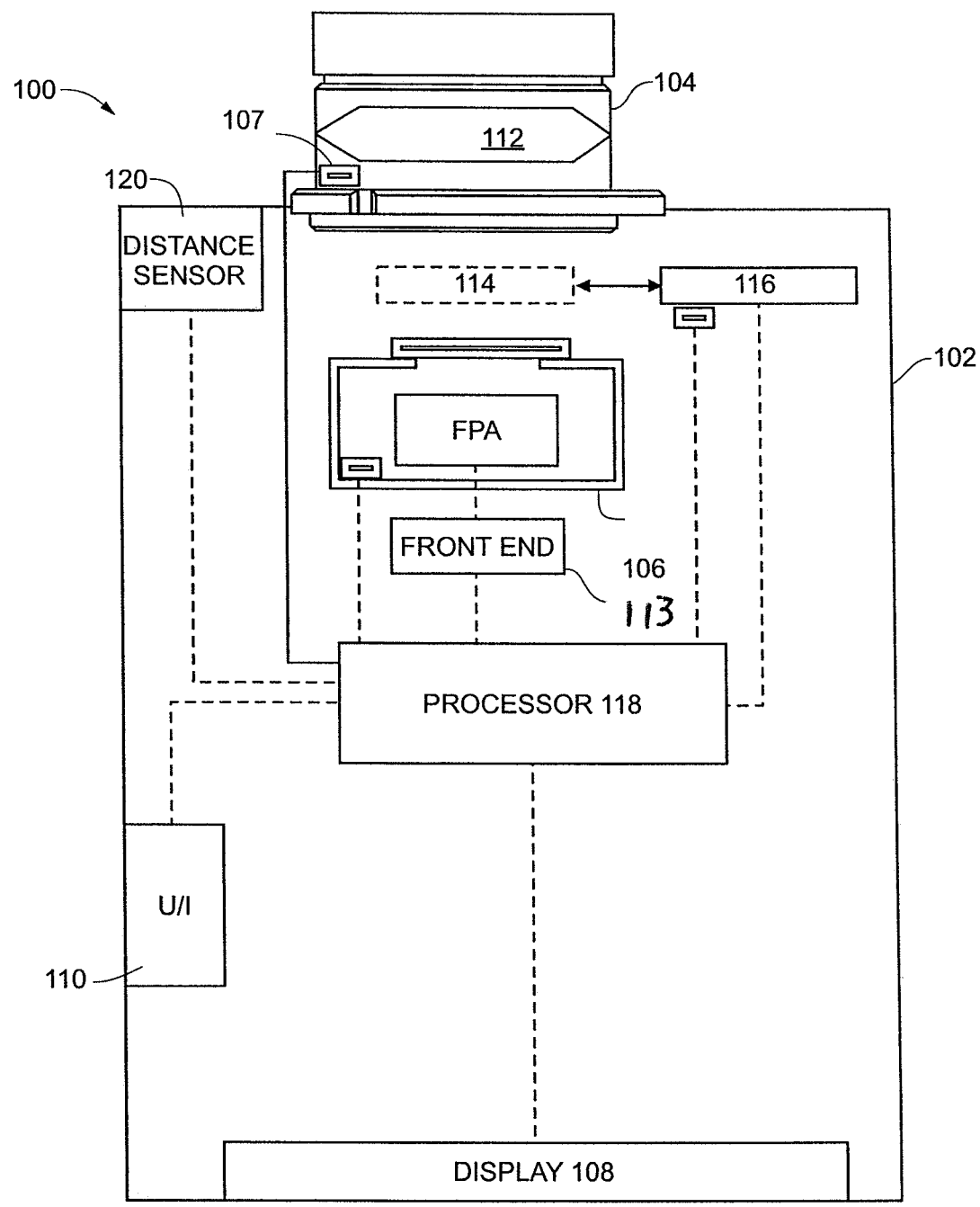
FIG. 1 is a schematic diagram of an infrared camera according to some embodiments of the present invention.

FIG. 1 provides a schematic diagram of an IR camera 100 according to certain embodiments of the present invention. Camera 100 includes camera housing 102 that holds several components including an IR lens assembly 104 and an infrared sensor 106, such as a focal plane array (FPA) of microbolometers. The housing 102 includes a display 108 and a user interface 110. The display 108 is used for displaying infrared or thermal image data and other information to the user. The user interface 110 contains various controls with which the user may control and operate the camera 100. The housing 102 also holds an electronic system that controls camera operation and communicates, as shown by the dotted lines, with several of the camera 100 components. The lens assembly 104 includes an IR lens 112 for receiving a cone of IR energy from a target scene.

In operation, the camera 100 receives image information in the form of infrared energy through the lens 112, and in turn, the lens 112 directs the infrared energy onto the FPA 106. The combined functioning of the lens 112 and FPA 106 enables further electronics within the camera 100 to create an image based on the image view captured by the lens 112, as described below.

The FPA 106 can include a plurality of infrared detector elements (not shown), e.g., including bolometers, photon detectors, or other suitable infrared detectors well known in the art, arranged in a grid pattern (e.g., an array of detector elements arranged in horizontal rows and vertical columns). The size of the array can be provided as desired and appropriate given the desire or need to limit the size of the distal housing to provide access to tight or enclosed areas. For example, many commercial thermal imagers have arrays of 640×480, 384×288, 320×240, 280×210, 240×180 and 160×120 detector elements, but the invention should not be limited to such. Also, some arrays may be 120×120, 80×80 or 60×60 detector elements, for example. In the future, other sensor arrays of higher pixel count will be more commonplace, such as 1280×720, for example. Some embodiments of the invention will be described using a 3×3 pixel matrix. In some embodiments involving bolometers as the infrared detector elements, each detector element is adapted to absorb heat energy from the scene of interest (focused upon by the lens 112) in the form of infrared radiation, resulting in a corresponding change in its temperature, which results in a corresponding change in its resistance. With each detector element functioning as a pixel, a two-dimensional image or picture representation of the infrared radiation can be further generated by translating the changes in resistance of each detector element into a time-multiplexed electrical signal that can be processed for visualization on a display or storage in memory (e.g., of a computer). Further front end circuitry 113 downstream from the FPA 106, as is described below, is used to perform this translation. Incorporated on the FPA 106 is a Read Out Integrated Circuit (ROIC), which is used to output signals corresponding to each of the pixels. Such ROIC is commonly fabricated as an integrated circuit on a silicon substrate. The plurality of detector elements may be fabricated on top of the ROIC, wherein their combination provides for the FPA 106. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the FPA 106 generates a series of electrical signals corresponding to the infrared radiation received by each infrared detector element to represent a thermal image. A "frame" of thermal image data is generated when the voltage signal from each infrared detector element is obtained by scanning all of the rows that make up the FPA 106. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the FPA 106, with such frames being produced at a rate sufficient to generate a video representation (e.g. 30 Hz, or 60 Hz) of the thermal image data.

In some embodiments, the camera 100 can further include a shutter 114 mounted within the camera housing 102. A shutter 114 is typically located internally relative to the lens 112 and operates to open or close the view provided by the lens 112. In the shutter open position 116, the shutter 114 permits IR radiation collected by the lens to pass to the FPA 106. In the closed position 114, the shutter blocks IR radiation collected by the lens from passing to the FPA 106. As is known in the art, the shutter 114 can be mechanically positionable, or can be actuated by an electro-mechanical device such as a DC motor or solenoid. Embodiments of the invention may include a calibration or setup software implemented method or setting which utilize the shutter 114 to establish appropriate bias (e.g. see discussion below) levels for each detector element.

The camera may include other circuitry (front end circuitry) for interfacing with and controlling the optical components. In addition, front end circuitry 113 initially processes and transmits collected infrared image data to the processor 118. More specifically, the signals generated by the FPA 106 are initially conditioned by the front end circuitry 113 of the camera 100. In certain embodiments, as shown, the front end circuitry 113 includes a bias generator and a pre-amp/integrator. In addition to providing the detector bias, the bias generator can optionally add or subtract an average bias current from the total current generated for each switched-in detector element. The average bias current can be changed in order (i) to compensate for deviations to the entire array of resistances of the detector elements resulting from changes in ambient temperatures inside the camera 100 and (ii) to compensate for array-to-array variations in the average detector elements of the FPA 106. Such bias compensation can be automatically controlled by the camera 100 via processor 118. Following provision of the detector bias and optional subtraction or addition of the average bias current, the signals can be passed through a pre-amp/integrator. Typically, the pre-amp/integrator is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 118 of the camera 100.

In some embodiments, the front end circuitry can include one or more additional elements for example, additional sensors or an ADC. Additional sensors can include, for example, temperature sensors 107, visual light sensors (such as a CCD), pressure sensors, magnetic sensors, etc. Such sensors can provide additional calibration and detection information to enhance the functionality of the camera 100. For example, temperature sensors can provide an ambient temperature reading near the FPA 106 to assist in radiometry calculations. A magnetic sensor, such as a Hall effect sensor, can be used in combination with a magnet mounted on the lens to provide lens focus position information. Such information can be useful for calculating distances, or determining a parallax offset for use with visual light scene data gathered from a visual light sensor.

Generally, the processor 118, can include one or more of a field-programmable gate array (FPGA), a complex programmable logic device (CPLD) controller and a computer processing unit (CPU) or digital signal processor (DSP). These elements manipulate the conditioned scene image data delivered from the front end circuitry in order to provide output scene data that can be displayed or stored for use by the user. Subsequently, the processor 118 circuitry sends the processed data to the display 108, internal storage, or other output devices.

In addition to providing needed processing for infrared imagery, such as non-uniformity correction which is well known by those of ordinary skill in the art. In some embodiments, front end components can further include a shutter 114. A shutter 112 can be externally or internally located relative to the lens 114 and operate to open or close the view provided by the IR lens assembly 104. As is known in the art, the shutter 114 can be mechanically positionable, or can be actuated by an electro-mechanical device such as a DC motor or solenoid. Embodiments of the invention may include a calibration or setup software implemented method or setting which utilize the shutter 114 to establish appropriate bias levels for each detector element. Individual pixels within an infrared local plane array (FPA) have unique response characteristics. Left uncorrected, these unique response characteristics can distort the resulting infrared measurements. Correction for these non-uniformities is found in most conventional infrared cameras because it leads to improved imaging capabilities. Shutters, such as shutter 114, are employed in certain embodiments to perform non-uniformity correction in a known manner. The processor circuitry can be employed for a wide variety of additional functions. For example, in some embodiments, the processor 118 can perform temperature calculation/conversion (radiometry), combine scene information with data and/or imagery from other sensors, or compress and translate the image data. Additionally, in some embodiments, the processor 118 can interpret and execute commands from the user interface 110. This can involve processing of various input signals and transferring those signals where other camera components can be actuated to accomplish the desired control function. Exemplary control functions can include adjusting the focus, opening/closing the shutter, triggering sensor readings, adjusting bias values, etc. Moreover, input signals may be used to alter the processing of the image data that occurs at the processor 118.

The processor 118 circuitry can further include other components to assist with the processing and control of the camera 100. For example, as discussed above, in some embodiments, an ADC can be incorporated into the processor 118. In such a case, analog signals conditioned by the front-end circuitry 113 are not digitized until reaching the processor 118. Moreover, some embodiments can include additional on board memory for storage of processing command information and scene data, prior to transmission to the display 108.

The camera 100 may include a user interface 110 that has one or more controls for controlling device functionality. For example, the camera 100 may include a knob or buttons installed in the handle for adjusting the focus or triggering the shutter.

Camera 100 may also contain a visible light (VL) camera module. The placement of the VL camera optics and IR camera optics is such that the visible and infrared optical axes are offset and roughly parallel to each other, thereby resulting in parallax error.

The parallax error may be corrected manually or electronically. For example, U.S. Pat. No. 7,538,326 entitled "Visible Light and IR Combined Image Camera with a Laser Pointer," is incorporated herein in its entirety, discloses a parallax error correction architecture and methodology. This provides the capability to electronically correct the IR and VL images for parallax. In some embodiments, thermal instrument 100 includes the ability to determine the distance to target and contains electronics that correct the parallax error caused by the parallel optical paths using the distance to target information.

For instance, camera 100 may include a distance sensor 120 that can be used to electronically measure the distance to target. Several different types of distances sensors may be used, such as laser diodes, infrared emitters and detectors, ultrasonic emitters and detectors, for example. The output of the distance sensor 120 may be fed to the processor 118 for use by the processor 118.

Typical infrared lenses have a low F-number, resulting in a shallow depth of field. Accordingly, as noted above in the '326 patent incorporated by reference, the camera can sense the lens position in order to determine the distance to target.

Figure 2:
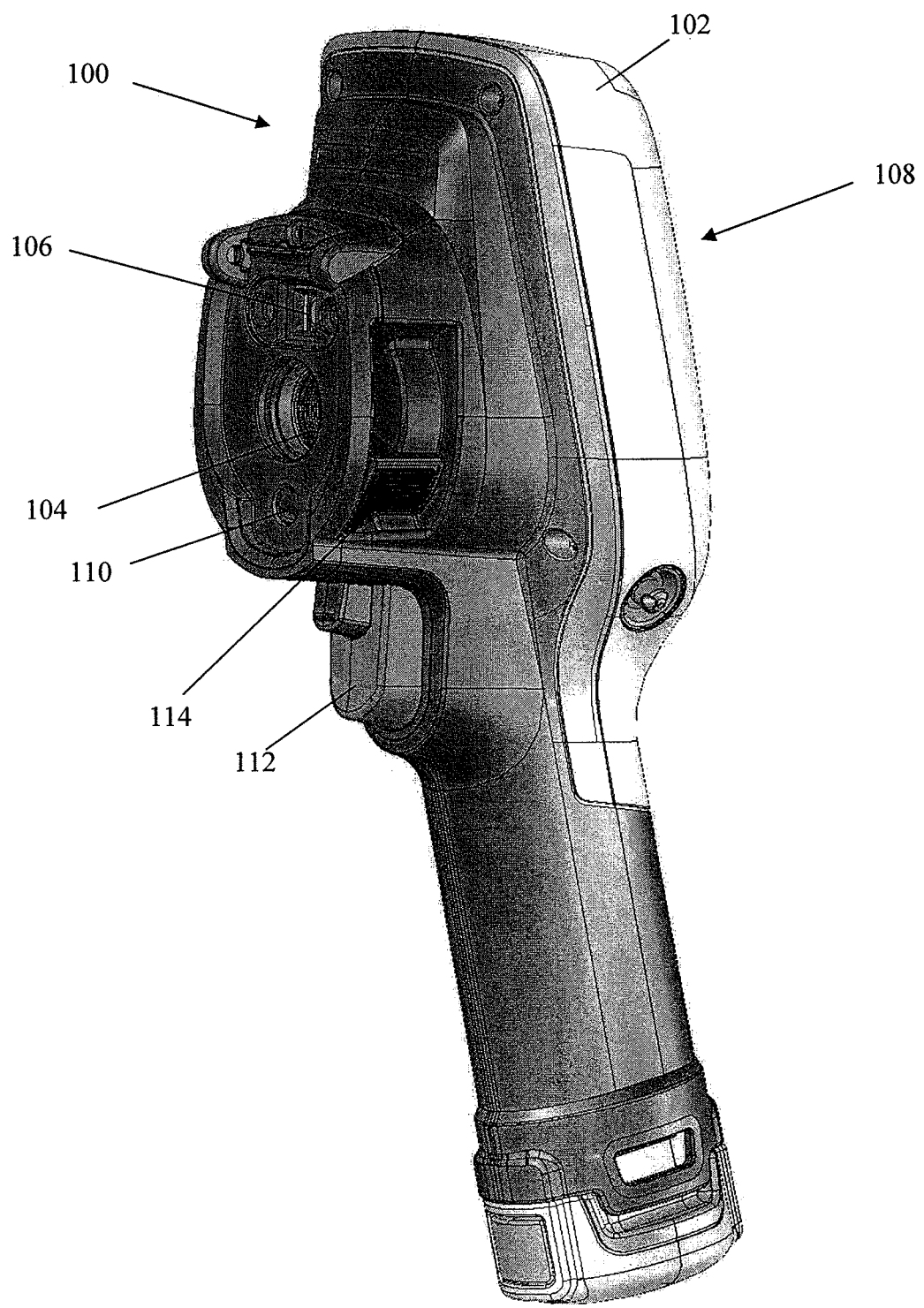
FIG. 2 is a front perspective view of an infrared camera according to some embodiments of the present invention.
Figure 3:
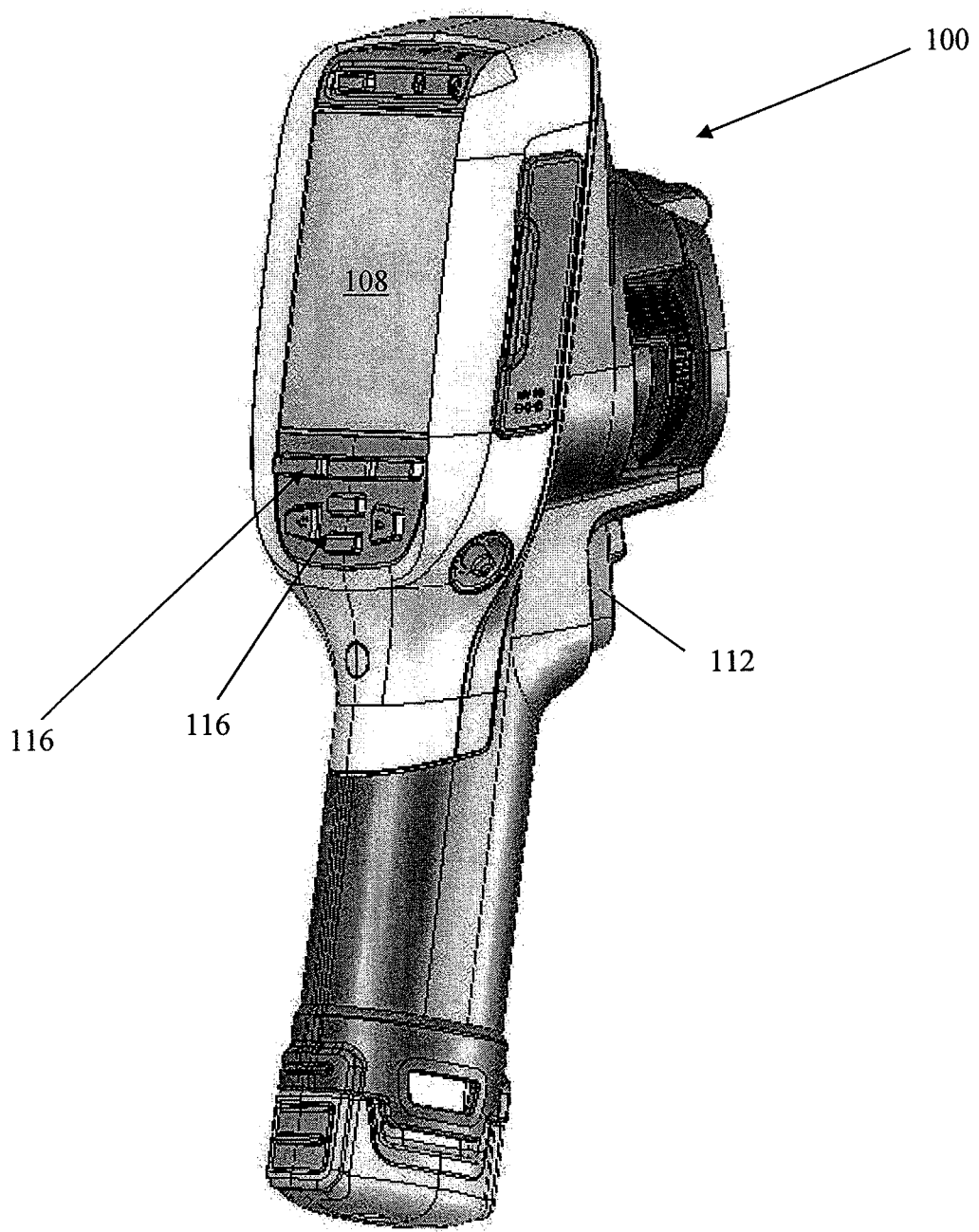
FIG. 3 is a back perspective view of an infrared camera according to some embodiments of the present invention.

FIGS. 2 and 3 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 2 and 3, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one, application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

Data of the distance-to-target, as measured by the laser 110, can be stored and associated with the corresponding captured image. For images which are captured using automatic focus, this data will be gathered as part of the focusing process. In some embodiments, the thermal imaging camera will also detect and save the distance-to-target data when an image is captured. This data may be obtained by the thermal imaging camera when the image is captured by using the laser 110 or, alternatively, by detecting the lens position and correlating the lens position to a known distance-to-target associated with that lens position. The distance-to-target data may be used by the thermal imaging camera 100 to direct the user to position the camera at the same distance from the target, such as by directing a user to move closer or further from the target based on laser measurements taken as the user repositions the camera, until the same distance-to-target is achieved as in an earlier image. The thermal imaging camera may further automatically set the lenses to the same positions as used in the earlier image, or may direct the user to reposition the lenses until the original lens settings are obtained.

During operation of thermal imaging camera 100, an operator may wish to view a thermal image of a scene and/or a visible light image of the same scene generated by the camera. For this reason, thermal imaging camera 100 may include a display. In the examples of FIGS. 2 and 3, thermal imaging camera 100 includes display 108, which is located on the back of housing 102 opposite infrared lens assembly 104 and visible light lens assembly 106. Display 108 may be configured to display a visible light image, an infrared image, and/or a combined image that is a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 3, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 2 and 3, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 4:
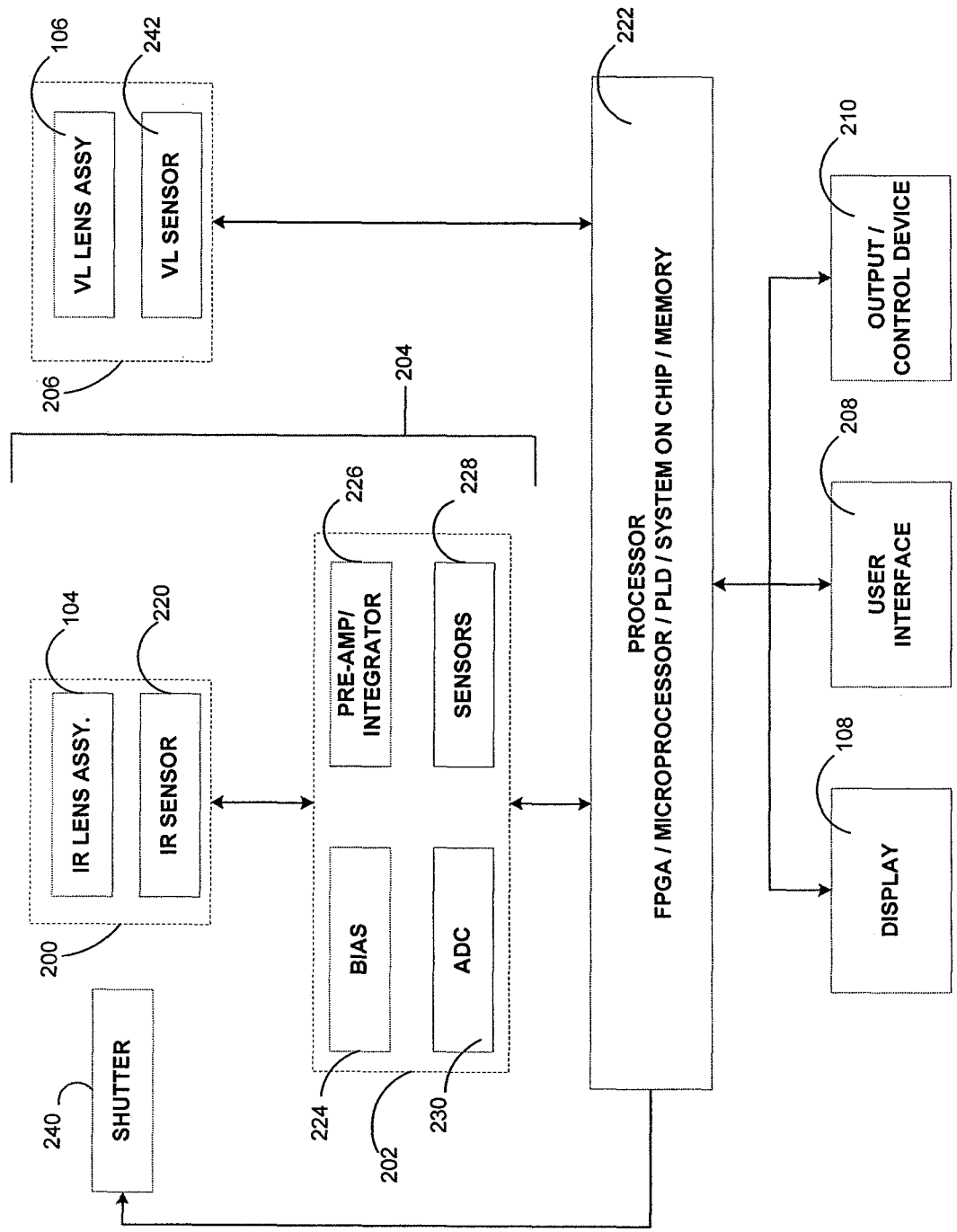
FIG. 4 is a functional block diagram illustrating components of another example of thermal imaging camera 100.

FIG. 4 is a functional block diagram illustrating components of another example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 2 and 3, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared lens assembly 104 can have a variety of different configurations. In some examples, infrared lens assembly 104 defines a F-number (which may also be referred to as a focal ratio or F-stop) of a specific magnitude. A F-number may be determined by dividing the focal length of a lens (e.g., an outermost lens of infrared lens assembly 104) by a diameter of an entrance to the lens, which may be indicative of the amount of infrared radiation entering the lens. In general, increasing the F-number of infrared lens assembly 104 may increase the depth-of-field, or distance between nearest and farthest objects in a target scene that are in acceptable focus, of the lens assembly. An increased depth of field may help achieve acceptable focus when viewing different objects in a target scene with the infrared optics of thermal imaging camera 100 set at a hyperfocal position. If the F-number of infrared lens assembly 104 is increased too much, however, the spatial resolution (e.g., clarity) may decrease such that a target scene is not in acceptable focus.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160 or 640×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens 104 and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at a given point in time.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 4, visible light camera module 206 is illustrated as including visible light lens assembly 106 and visible light sensor 242. As described above with respect to FIGS. 2 and 3, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108.

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

As noted above, processor 222 may be configured to determine a distance between thermal imaging camera 100 and an object in a target scene captured by a visible light image and/or infrared image generated by the camera. Processor 222 may determine the distance based on a focus position of the infrared optics associated with the camera. For example, processor 222 may detect a position (e.g., a physical position) of a focus mechanism associated with the infrared optics of the camera (e.g., a focus position associated with the infrared optics) and determine a distance-to-target value associated with the position. Processor 222 may then reference data stored in memory that associates different positions with different distance-to-target values to determine a specific distance between thermal imaging camera 100 and the object in the target scene.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In a combined arrangement, the visible light image and the infrared image may be superimposed on top of one another. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an example combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like.

Additionally, in some embodiments, the processor 222 can interpret and execute commands from user interface 208, an output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale or amber. In other examples, display 108 is configured to display an infrared image in a color palette such as, e.g., ironbow, blue-red, or other high contrast color scheme. Combination of grayscale and color palette displays are also contemplated.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

A thermal imager is defined by many parameters among which are its Field Of View (FOV), its Instantaneous Field Of View (IFOV), sometimes referred to as its spatial FOV, and its measurement instantaneous Field of View ($IFOV_{measurement}$), sometimes referred to as its measurement IFOV. The imager's FOV is the portion of a scene that the imager can see. It is typically described in horizontal degrees by vertical degrees, for example, 23°×17°, where degrees are units of angular measurement. Essentially, the FOV is a rectangle or square extending out from the center of the imager's lens extending outward. By analogy, an imager's FOV can be thought of as a windshield that one is looking out as one drives one's car down the road. The FOV is from the top of the windshield to the bottom, and from the left to the right. An imager's IFOV, otherwise sometimes known as its spatial resolution, is the FOV of a single pixel. IFOV is typically measured in units called milliradians (mRad). Like degrees, milliradians are units of angular measurement (PI radians=~3.14159 radians=180 degrees). IFOV (also sometimes called spatial IFOV) represents the camera's spatial resolution only, not its temperature measurement resolution. Thus, the spatial IFOV of the camera may well enable finding a small hot or cold spot but not necessarily be sufficient to enable calculating the spot's temperature accurately because of the camera's temperature measurement resolution. Continuing the windshield analogy, the spatial IFOV can be thought of as the ability to see a roadside sign in the distance through the windshield. One can see that it is a sign but one may not be able to read what is on the sign when the sign becomes first recognizable. To be able to calculate the temperature measurement of an object of interest relies on the imager's $IFOV_{measurement}$, otherwise sometimes known as the camera's temperature measurement resolution. It is the smallest detail that one can get an accurate calculated temperature measurement upon. Its size, in linear dimension, depends on the distance from the camera to the object of interest. $IFOV_{measurement}$ is also specified in milliradians and is often two to three times the specified spatial resolution (i.e., spatial IFOV) because more imaging data is needed to accurately calculate a temperature measurement. Returning to the windshield/road analogy, when one sees the sign in the distance but one cannot read it, one would either move closer until one could read it or one would use an optical device to effectively bring one closer so that one could read the sign. The $IFOV_{measurement}$ is the angular size that the object of interest needs to be in order to read it. In order to know the size in linear dimensions, one has to know the distance the camera is from the object of interest.

Figure 5:
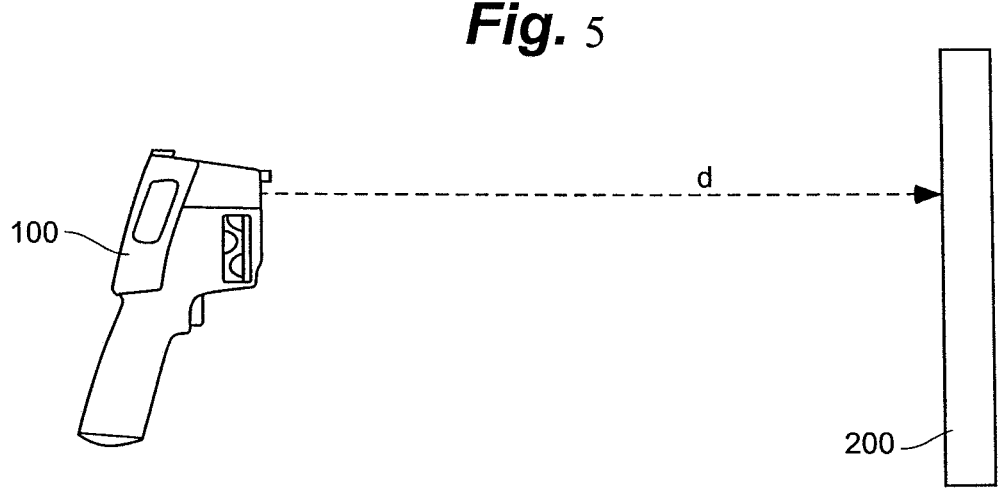
FIG. 5 is a schematic illustration of measuring the distance between the camera and an object of interest.

FIG. 5 illustrates using the IR camera 100 to measure a distance, d, between itself and an object of interest 200. Various distance measuring devices may be incorporated into the camera such as a laser distance measurement device, for example, as previously mentioned.

Figure 6:
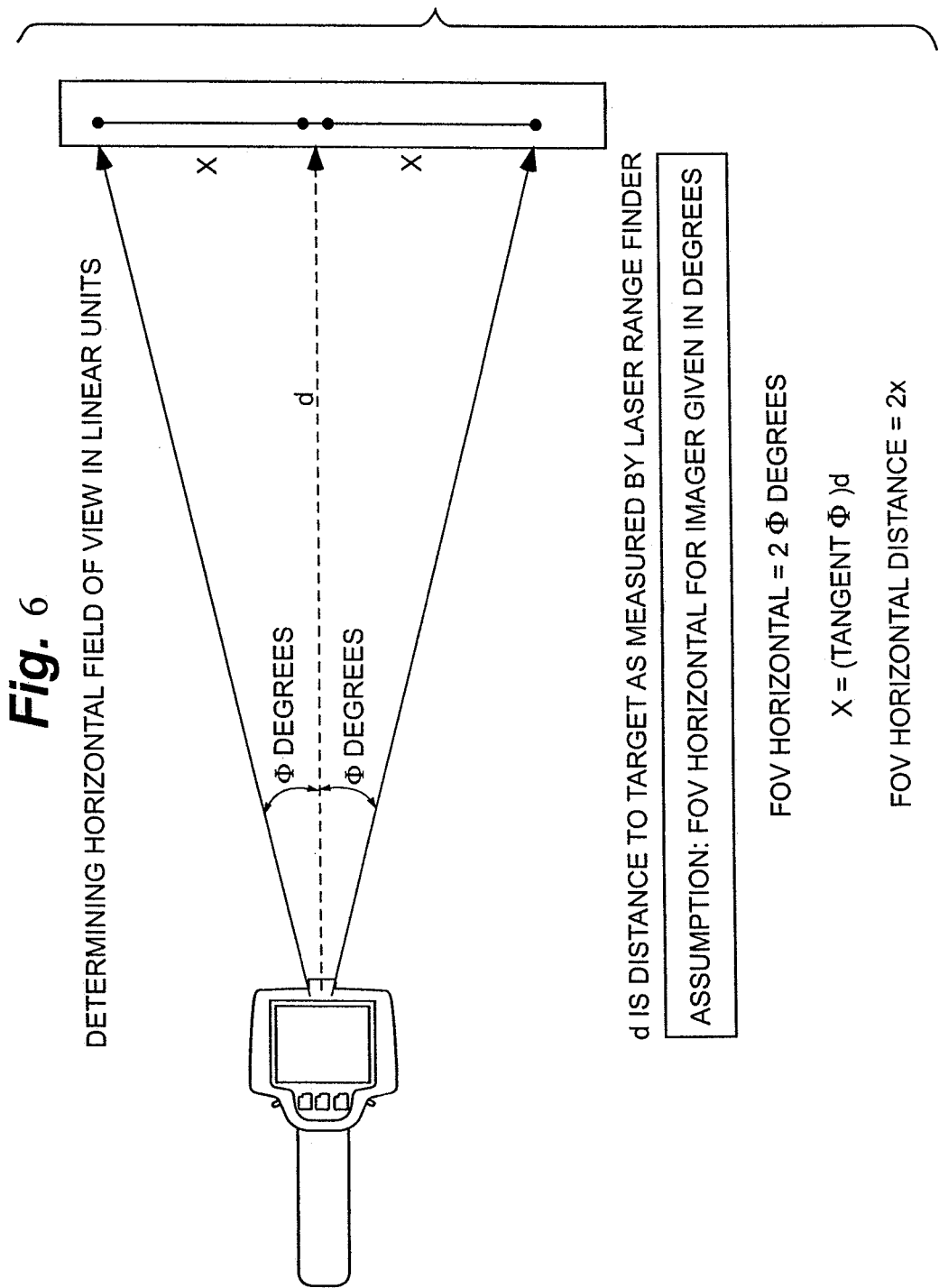
FIG. 6 is a schematic illustration of determining horizontal field of view in linear units.
Figure 7:
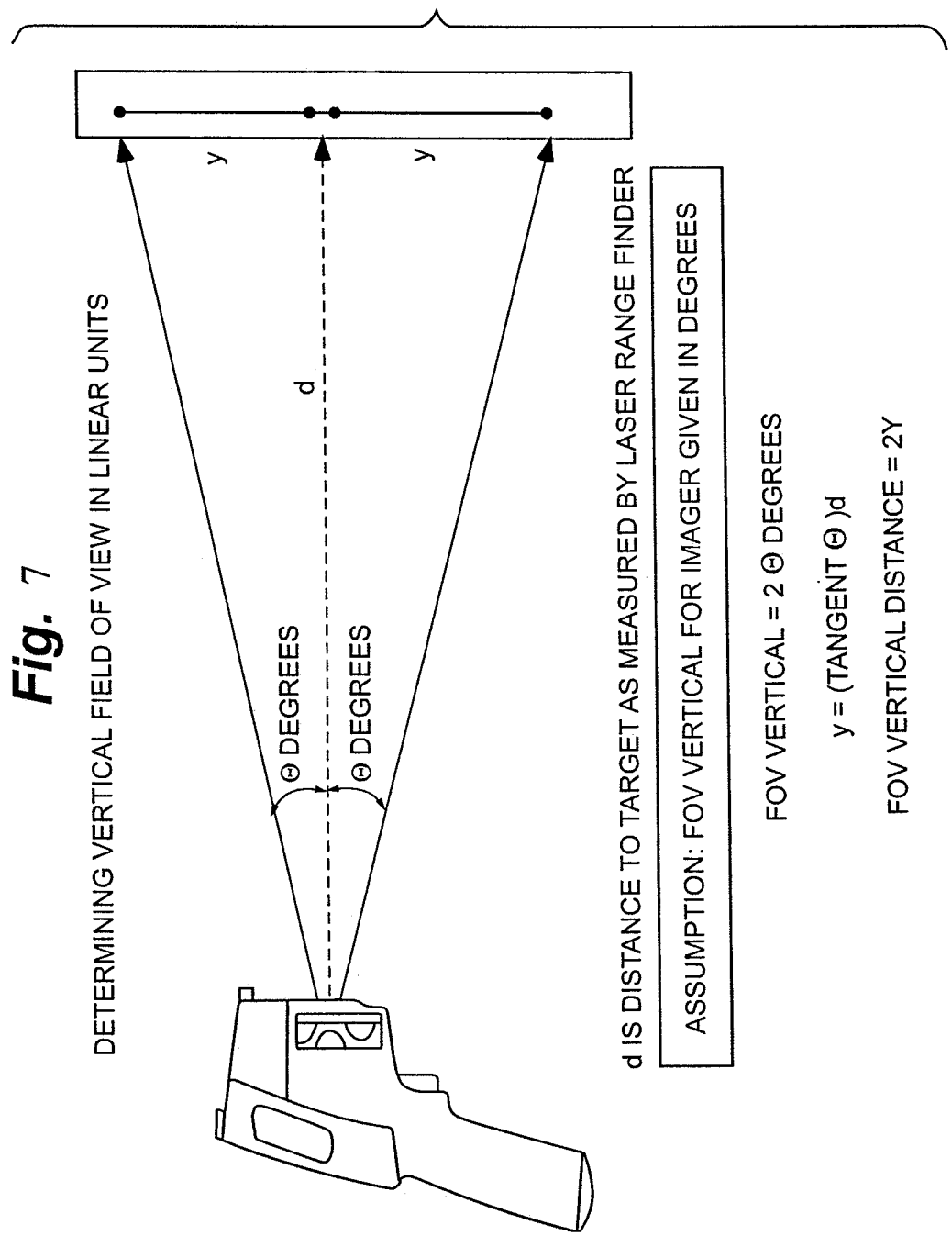
FIG. 7 is a schematic of illustration of determining vertical field of view in linear units.
Figure 8:
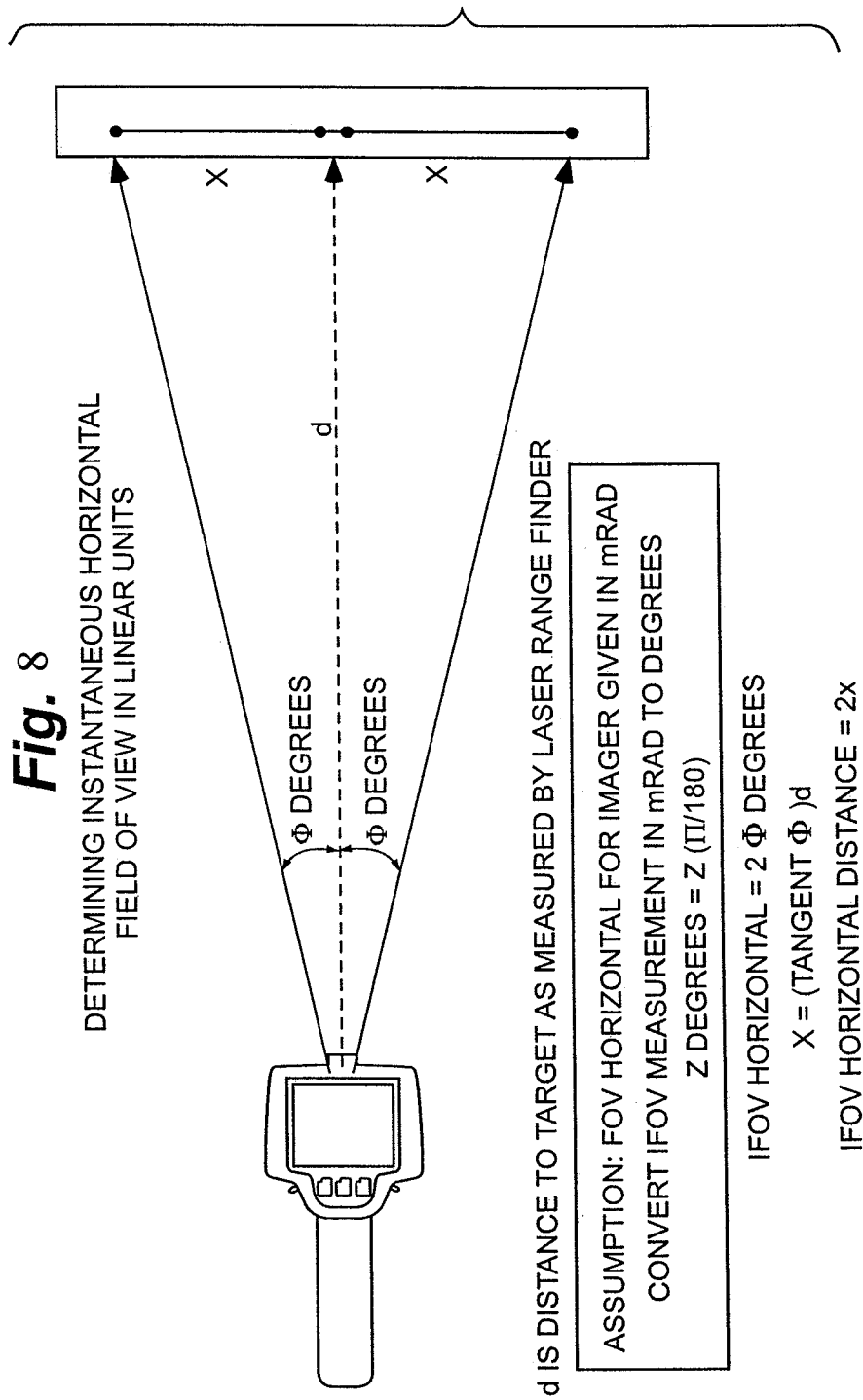
FIG. 8 is a schematic illustration of determining horizontal spatial instantaneous field of view in linear units.
Figure 9:
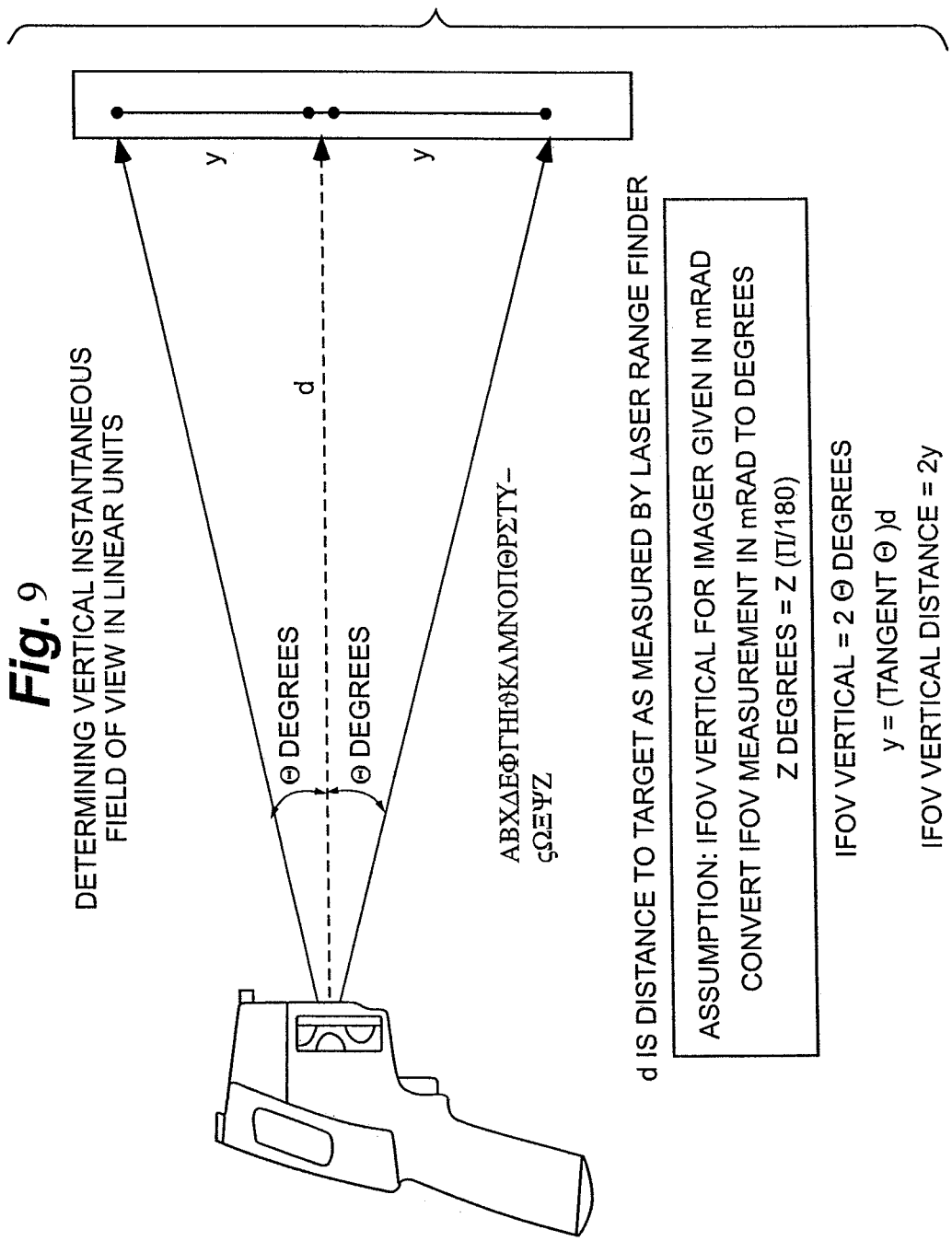
FIG. 9 is a schematic illustration of determining vertical spatial instantaneous field of view in linear units.

FIGS. 6 and 7 are schematic illustrations of calculating the horizontal and vertical field of view (FOV) of the camera at a certain set distance, d, in linear units. As previously mentioned, normally for each camera its $FOV_{horizontal}$ and $FOV_{vertical}$ are given in degrees such as 23°×17°. The following calculations are used to convert the FOV into linear units:

$FOV_{vertical}=2\theta$ $FOV_{horizontal}=2\phi$ y=(Tangent $\theta$) multiplied by d x=(Tangent $\phi$) multiplied by d So $FOV_{vertical\ distance}=2y$ So $FOV_{horizontal\ distance}=2x$ Next, FIGS. 8 and 9 illustrate calculating the horizontal and vertical IFOV, respectively, of the camera at that distance, d, in linear units. This is the spatial resolution, the size of the field of view of a single pixel at the set distance. As previously mentioned, IFOV is usually specified in mRad so it may be more convenient to convert it to degrees when using the equations to determine linear dimensions of IFOV values.

The $IFOV_{measurement}$ determines the size of what can be accurately measured, temperature wise. As stated above, it is specified in angular units (e.g. milliradians) with the corresponding linear size depending on the distance, d, of the camera to the object of interest. Thus, while an object of interest may be larger than the camera's $IFOV_{spatial}$ one still may not be able to accurately calculate its temperature because the object of interest is smaller than the camera's measurement resolution (i.e., smaller than $IFOV_{measurement}$).

As previously mentioned, typically the temperature measurement resolution ($IFOV_{measurement}$) of the camera is two to three times larger than its spatial resolution (IFOV). The $IFOV_{measurement}$ may be estimated by multiplying the $IFOV_{spatial}$ by a factor of 2 or 3. Alternately, the $IFOV_{measurement}$ may be calculated in linear units by measuring the distance between the camera and the object of interest using the equations in paragraph [42] along the measurement IFOV's parameters.

Figure 10:
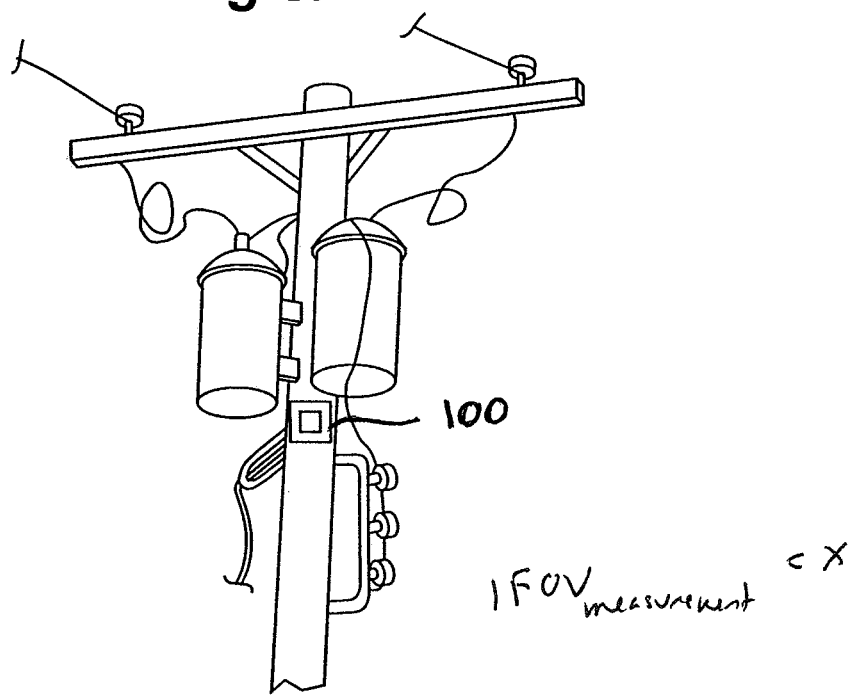
FIG. 10 is a display shot of an infrared or thermal image showing a measurement target.

FIG. 10 shows a display shot of a thermal or infrared image on the camera's display 108 (See FIG. 1) viewable by a user of the camera. The display shows the camera's FOV and the current measured distance. Within the FOV are various items that can be seen, a transformer pole, two transformers, wiring and another pole.

One of the transformers is emitting more radiant energy than the other and this is shown by its brightness in the display (because the Figures are in black and white, they do not illustrate brightness levels).

Preferably, a graphical icon 100, such as a box, representing the size of the camera's $IFOV_{measurement}$ is displayed on the LCD display of the camera. In addition to, or alternately, the linear value of the $IFOV_{measurement}$ is calculated by measuring the distance between the camera and the object of interest and the linear value of the measurement IFOV is displayed on the LCD, as shown. In this embodiment, the graphical icon 100 is a square box which represents the size an object of interest needs to be in the image in order to have its temperature accurately calculated. Preferably the box is located in the center of the LCD display, however, it may be located at other positions. As it turns out, the size of this $IFOV_{measurement}$ box 100 on the LCD display is independent of the target distance; however, the size (linear dimensions) of the target object (e.g., portion of the scene) covered by the box depends on the target distance, as described above. As mentioned, in one embodiment the $IFOV_{measurement}$ in linear units may be displayed on the LCD. If an operator of the camera knows the approximate size of the object of interest and knows what the $IFOV_{measurement}$ is in linear units, then the operator can determine if the object is big enough to have its temperature accurately measured.

In another embodiment, the graphical icon 100 is used to help the operator determine if an object (or a portion of an object) displayed on the LCD is large enough to have its temperature measured. More particularly, if the object (or a portion of the object) fills the box 100, then the operator can be confident that an accurate temperature measurement can be made. As seen in FIG. 9, the graphical box 100 is registered on the first pole. It can be seen that the pole fills the area delineated by the graphical icon. In such a situation, the calculation of temperature from each pixel should be of a comparable temperature (assuming the temperature of the pole is uniform) since they are all exposed to the same object of interest, the pole. As will be discussed hereinafter, the camera will indicate to the user that the calculated temperature measurement of the pole should be acceptable.

Figure 11:
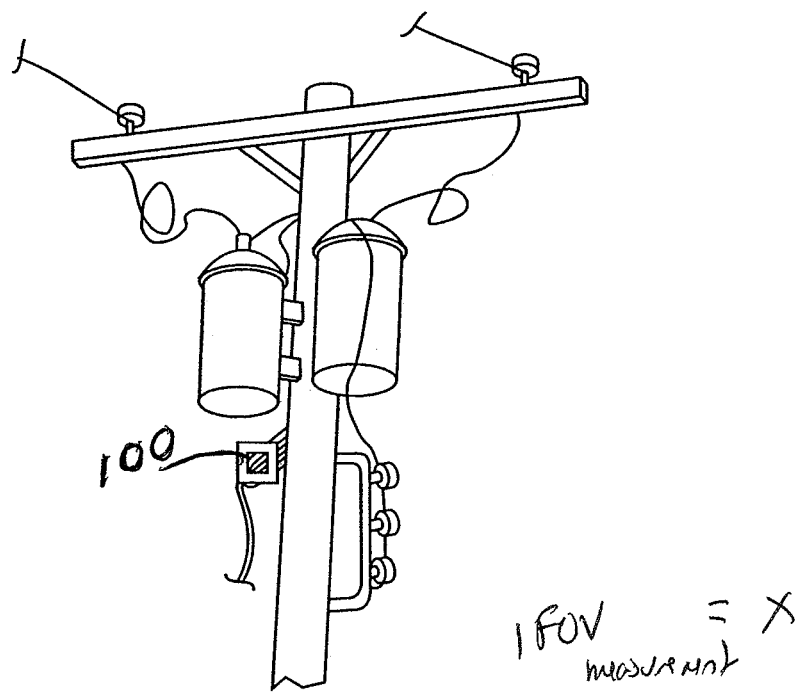
FIG. 11 is another display shot of an infrared or thermal image showing a different measurement target.

FIG. 11 illustrates a situation where the calculated temperature measurement will not be acceptable. The graphical icon 100 is registered on a wire. While the wire is certainly visible, it does not meet the camera's temperature measurement resolution (i.e., it is too narrow and smaller than $IFOV_{measurement}$ for the distance it is at). The pixels that show the wire are also receiving energy information from other objects such as the surrounding environment, in this case the atmosphere (i.e., the sky in the background). Thus, the calculated temperature will be a blend of the wire temperature and the sky temperature and thus will not accurately represent the temperature of the wire.

Figure 12:
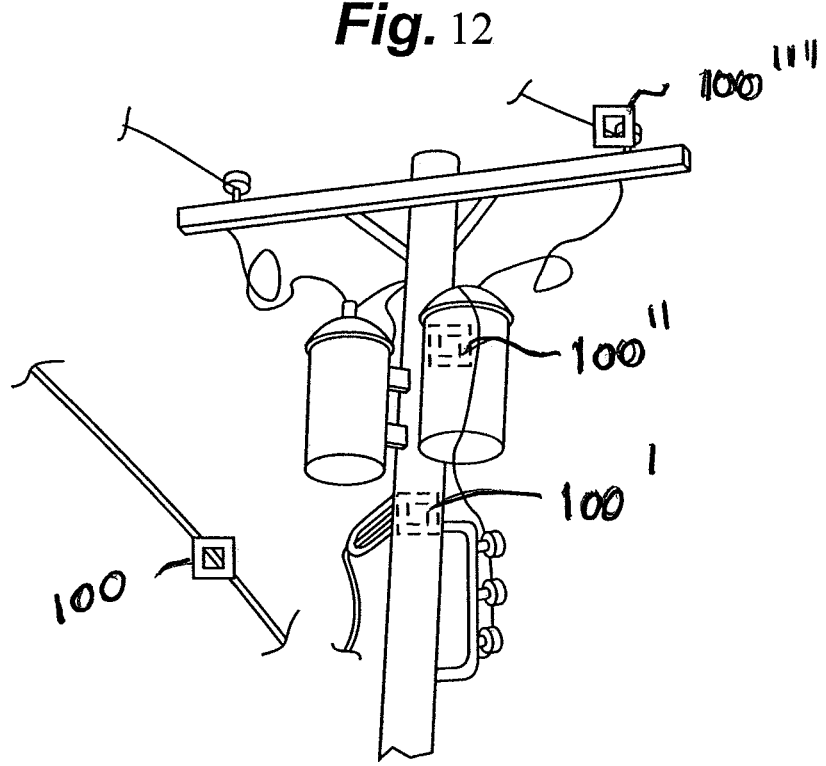
FIG. 12 is a marked-up display shot of an infrared or thermal image showing multiple measurement targets.

FIG. 12 is a marked-up display shot of an infrared or thermal image showing multiple measurement targets.

In the representative display shot shown in FIG. 12, there are four boxes 100, 100$^1$, 100$^{11}$, 100$^{111}$ shown by way of example. For practical purposes, there will be one box located in the center of the image so FIG. 12 represents, with respect to the graphical icon, four different images.

Looking first at the transformer as the object of interest, when the graphical icon 100$^{11}$ is registered with it, the transformer is large enough at that distance to have its temperature measurement accurately calculated. The same is true when graphical icon $100^1$ is registered with the pole as previously discussed.

Contrarily, when the graphical icon $100^{111}$ is registered with the top wire, while one is able to see the wire using thermal imagery, it is not large enough at this particular distance, to have its temperature measurement accurately calculated. The user will have to either get physically closer to the wire or get optically closer by using a telephoto lens, for example, so that at a new distance enough of the wire fills the box $100^{111}$ representing the imager's IFOV$_{measurement}$ in order to have its temperature accurately calculated. The same is true for the graphical icon 100 focused on the splice on the lower wire. At this particular distance, the imager is also picking up the surrounding energy of the background (sky) and does not allow for an accurate temperature measurement calculation of the object of interest.

The user may be provided with a visual indication on the display that either an accurate temperature measurement calculation can be made by displaying text such as "optimum accuracy" or that one cannot be made by displaying text such as "alarm—not accurate." In addition, or in lieu thereof, an audio and/or vibrational/tactile indication may be rendered.

Alternatively, the graphical icon need not be a box but rather could be a mark such as an X in the center of the display. When the user registers that mark on an object of interest, graphical or audio messaging or both may be provided to indicate whether the temperature measurement will be accurate or not.

Also, particularly with audio indication, the user may be told that at that distance an accurate temperature measurement calculation cannot be made and that he or she needs to move closer to the object of interest, either physically or optically, and for each new distance the user establishes, a new audio will be generated, either telling the user to still move closer or telling the user that he is close enough to the object of interest for an accurate temperature measurement calculation to be made.

Figure 13:
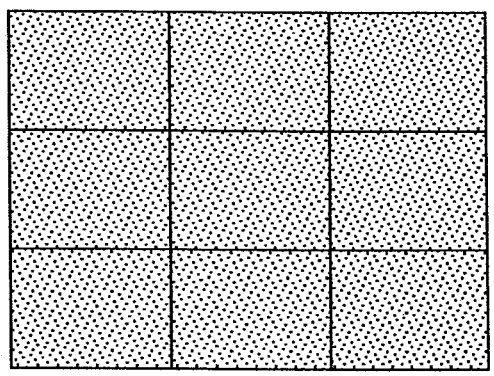
FIG. 13 is an illustration of a 3×3 pixel matrix in a state where an accurate temperature measurement can be made.
Figure 14:
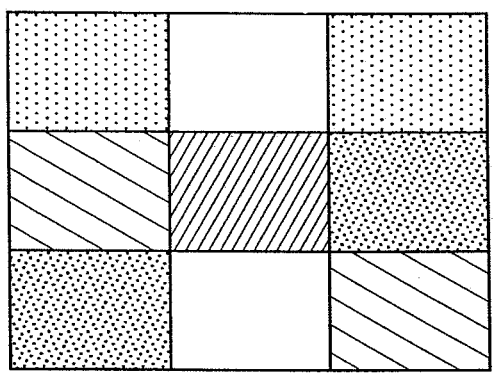
FIG. 14 is an illustration of the 3×3 pixel matrix in a state where an accurate temperature measurement cannot be made.

FIGS. 13 and 14 are illustrations of a 3×3 pixel matrix in a state where an accurate temperature measurement calculation can and cannot be made, respectively. The pixel matrix has been previously corrected for non-uniformity. In FIG. 13, each pixel is shaded the same intensity indicating that each is registering a similar value and thus each pixel is likely reading the energy from the same object of interest. In FIG. 14, each pixel is shaded differently from its neighboring pixels indicating that each pixel is reading the energy of different object temperatures and thus the value coming out of the pixel array would not reflect an accurate temperature measurement calculation of one object of interest.

Figure 15:
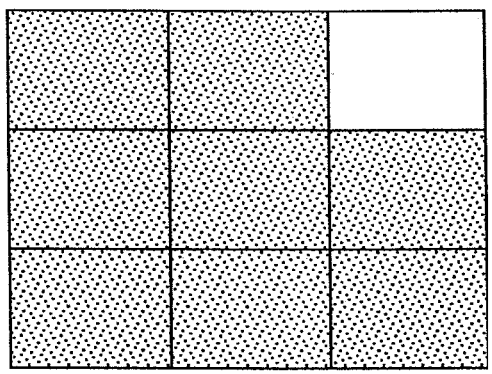
FIGS. 15 and 16 are illustrations of the 3×3 pixel matrix in a state where an accurate measurement cannot be made.
Figure 16:
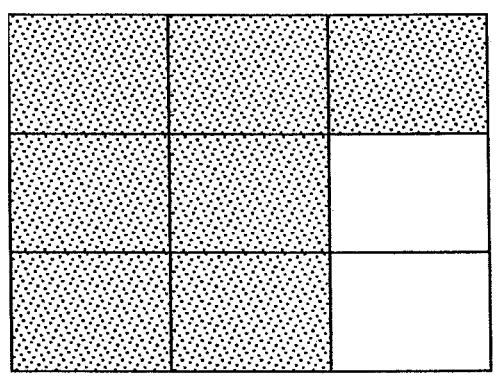

FIGS. 15 and 16 are illustrations of the 3×3 pixel matrix in a state where an accurate temperature measurement calculation cannot be made. Unlike FIG. 13 in which all of the pixels were registering the same value, in FIGS. 15 and 16 one or two pixels, respectively are not. The processor 118 receives the information from the pixel matrix and performs a statistical analysis on that data to see if it can be used to indicate an accurate temperature measurement calculation. The processor 118 may compute an arithmetic difference between the maximum value and minimum value associated with the data. If the difference between these maximum and minimum values exceeds a predetermined threshold, then the processor 118 indicates this data is not usable as an accurate temperature measurement. In an alternate embodiment, the processor 118 computes an arithmetic average of the data. If the difference between any of the data from each pixel and the average of the data from each pixel exceeds a predetermined threshold, then the processor 118 indicates the data is unusable for accurate temperature measurements.

Of course, those of ordinary skill in the art will appreciate that other statistical analyses may be performed other than those specifically mentioned herein. The objective of the statistical analysis is to determine the uniformity of the data obtained by the pixel matrix in order to indicate whether an accurate temperature measurement will be obtained. If there is too much variation in the data obtained by the matrix, that suggests that objects other than the object of interest are also being detected, such as the background/sky, for example, and a reliable temperature measurement of the object of interest (or region of the object) cannot be made.

The methods discussed in the subject application may be implemented as a computer program product having a computer usable medium having a computer readable program code embodied therein, the computer readable program code adapted to be executed by the processor 118 to implement the method. In addition, the methods may be implemented by a processor of a thermal imaging camera.

Figure 17:
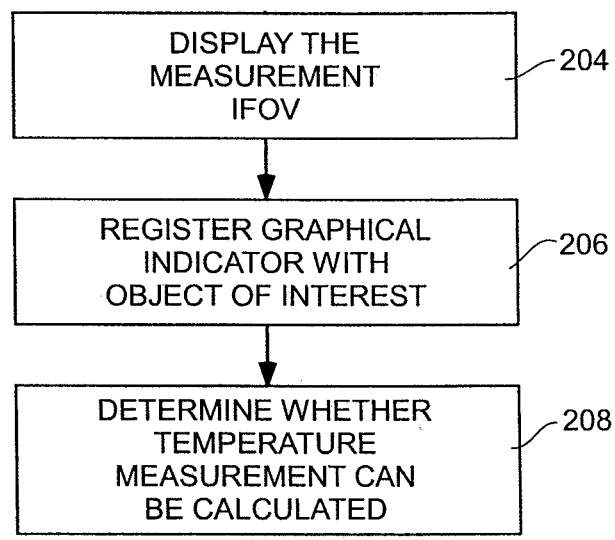
FIG. 17 is a flow chart of a method of determining whether an object of interest can have its temperature measurement accurately calculated by a thermal imaging camera according to an embodiment of the invention.

FIG. 17 is a flow chart of a method of determining whether an object of interest can have its temperature measurement accurately calculated by a thermal imaging camera according to an embodiment of the invention. The method involves a) displaying a measurement IFOV on a display of the camera as a graphical box (step 200);

b) registering the graphical box with the object of interest on the display (step 202); and c) determining whether the thermal image of the object of interest fills the graphical box thereby indicating a reliable temperature of the object of interest can be made (step 204).

Figure 18:
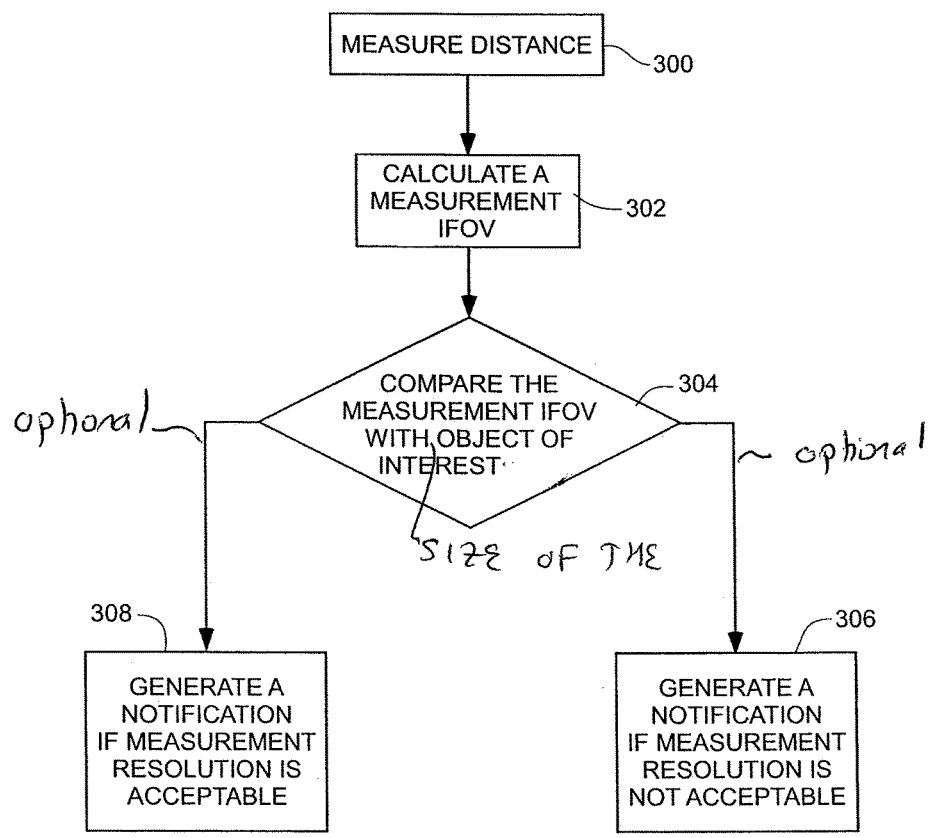
FIG. 18 is a flow chart of a method of determining whether an object of interest can have its temperature measurement accurately calculated by a thermal imaging camera according to an embodiment of the invention.

FIG. 18 is a flow chart of a method of determining whether an object of interest can have its temperature measurement accurately calculated by a thermal imaging camera according to an embodiment of the invention. The method involves the steps of:

a) determining a distance between the camera and the object of interest (step 300);

b) calculating a measurement IFOV in linear units (step 302);

c) displaying the measurement IFOV in linear units on a display of the camera to be viewable by a user of the camera (step 304).

Step (a) may be performed by a distance sensor, such as a laser rangefinder, for example, or it may be entered by the user of the camera using a data entry device, for example.

Figure 19:
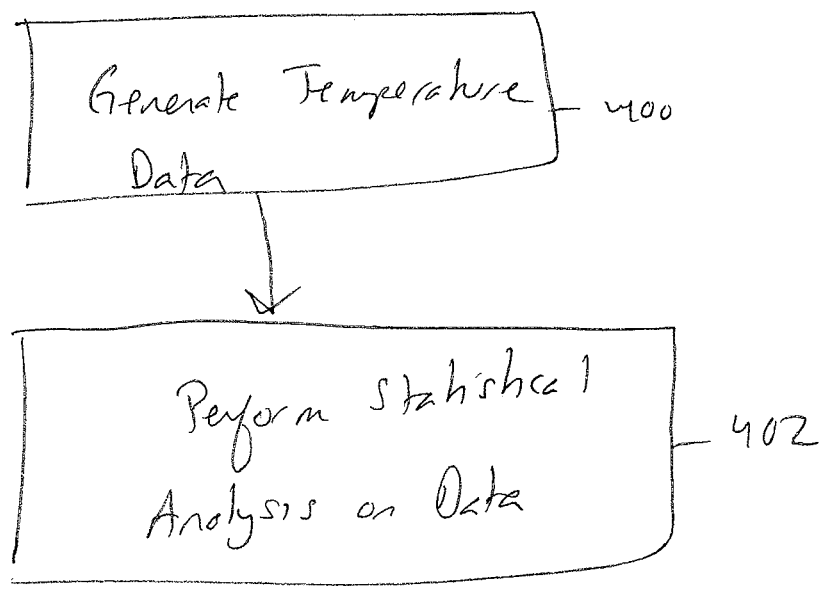
FIG. 19 is a flow chart of a method of determining whether an object of interest can have its temperature measurement accurately calculated by a thermal imaging camera according to an embodiment of the invention.

FIG. 19 is a flow chart of a method of determining whether an object of interest can have its temperature measurement accurately calculated by a thermal imaging camera according to an embodiment of the invention. The method involves the steps of:

a) generating temperature data of an object of interest in the form of a pixel matrix comprised of multiple pixels (step 400); and b) performing a statistical analysis on the data generated by the pixel matrix to determine uniformity of the data generated by the pixel matrix (step 402).

In addition, optionally, a notification may be generated based on the analysis performed in step (b). For example, the method could further involve the steps of generating a notification if the analysis performed in step (b) indicates that the data is not uniform. Or the method could involve the step of generating a notification if the analysis performed in step (b) indicates that the data is uniform.

Typically the pixel matrix is a three by three matrix.

Imagers are frequently used for inspection of high voltage electrical equipment which has a minimum required safe distance depending on the equipment's rating. Because the imaging camera according to the embodiments of the invention is able to measure distance to the target, it can be used to trigger any alert or alarm that a user is positioned an unsafe distance from an object or equipment such as electrical equipment. The alert may be visual, audible and/or vibrational/tactile.

For example, a user can select a mode that the imager is being used to measure electrical equipment that requires a safe distance between the user of the imager and the equipment. Alternatively, the imager may be continuously set to a mode that indicates to a user whether they are too close to the target.

As the user uses the imager to thermally image objects and/or equipment, the embodiments indicate to the user whether an accurate temperature measurement can be obtained. If not, the user is directed to move closer, either optically with a lens or physically, to the target. If the user moves physically closer to the object, an indicator will indicate if the user has crossed a threshold where the user is now at an unsafe distance from the equipment. The indicator may be a visual and/or audible alarm.

Example thermal image cameras and related techniques have been described. The techniques described in this disclosure may also be embodied or encoded in a computer-readable medium, such as a non-transitory computer-readable medium containing instructions. Instructions embedded or encoded in a computer-readable storage medium may cause a programmable processor, or other processor, to perform the methods, e.g., when the instructions are executed. Computer readable storage media may include random access memory (RAM), read only memory (ROM), a hard disk, optical media, or other computer readable media now known or later developed.

In the foregoing detailed description, the invention has been described with reference to specific embodiments. However, it may be appreciated that various modifications and changes can be made without departing from the scope of the invention as set forth in the appended claims.

What is claimed is:

1. A method of determining whether an object of interest can have its temperature measurement accurately calculated by a thermal imaging camera comprising:
   a) calculating a measurement instantaneous field of view (IFOV) of the camera and displaying the calculated measurement IFOV on a display of the camera as a graphical box such that the linear dimensions of the graphical box correspond to the size of the calculated measurement IFOV in linear units and represent the size of a smallest detail for which an accurate temperature can be calculated;
   b) registering the graphical box with the object of interest on the display; and
   c) determining whether or not a reliable temperature measurement of the object of interest can be made by determining whether the thermal image of the object of interest fills the graphical box thereby indicating that the size of object of interest is at least the size of the measurement IFOV and that a reliable temperature measurement of the object of interest can be made.

2. A method of determining whether an object of interest can have its temperature measurement accurately calculated by a thermal imaging camera comprising:
   a) determining a distance between the camera and the object of interest;
   b) calculating a measurement instantaneous field of view (IFOV) in linear units, the measurement IFOV corresponding to the linear dimensions of a smallest detail for which an accurate temperature can be calculated and being based on the determined distance between the camera and the object of interest; and
   c) displaying the calculated measurement IFOV in linear units on the display of the camera to be viewable by a user of the camera.

3. The method of claim 2 wherein step (a) is performed by a laser rangefinder.

4. The method of claim 2 wherein step (a) is performed by the user of the camera entering the distance information on a data entry device of the camera.

5. The method of claim 2 further comprising d) determining whether the camera is an unsafe distance from the object of interest and, if so, e) generating an alarm that the camera is at an unsafe distance.

6. A non-transitory computer-readable medium comprising executable instructions for causing a programmable processor to perform a method for determining whether an object of interest can have its temperature measurement accurately calculated by a thermal imaging camera, said method comprising:
   a) displaying a measurement instantaneous field of view (IFOV) on a display of the camera as a graphical box such that the linear dimensions of the graphical box correspond to the size of the calculated measurement IFOV in linear units and represent the size of a smallest detail for which an accurate temperature can be calculated; and
   b) registering the graphical box with the image of the object of interest on the display.

7. A portable, hand-held thermal imaging camera comprising:
   a lens assembly having an associated sensor for detecting thermal images of a target scene;
   a display adapted to display at least a portion of the thermal image;
   a processor programmed to calculate a measurement instantaneous field of view (IFOV) in linear units and display the calculated measurement IFOV in linear units on the display, the measurement IFOV corresponding to the linear dimensions of a smallest detail for which an accurate temperature can be calculated by the hand-held thermal imaging camera.

8. A camera according to claim 7 further comprising a distance measuring device for measuring the distance between the camera and the object of interest and providing that measurement to the processor in order for the processor to calculate the measurement IFOV in linear units.

9. A camera according to claim 7 further comprising an input device for entering data reflective of the distance between the camera and the object of interest and providing that data to the processor in order for the processor to calculate the measurement IFOV in linear units.

* * * * *